United States Patent
Weidinger et al.

(10) Patent No.: US 10,077,864 B2
(45) Date of Patent: Sep. 18, 2018

(54) FIRE PROTECTED CELLULAR POLYMERIC INSULATION

(75) Inventors: Jürgen Weidinger, Muenster (DE); Christoph Zauner, Muenster (DE); Daniel Klusmann, Muenster (DE)

(73) Assignee: ARMACELL ENTERPRISE GMBH & CO. KG, Schoenefeld ot Waltersdorf (DE)

( * ) Notice: Subject to any disclaimer, the term of this patent is extended or adjusted under 35 U.S.C. 154(b) by 1239 days.

(21) Appl. No.: 13/303,612

(22) Filed: Nov. 23, 2011

(65) Prior Publication Data

US 2012/0135202 A1    May 31, 2012

(30) Foreign Application Priority Data

Nov. 29, 2010  (EP) .................... 10192868

(51) Int. Cl.
| | |
|---|---|
| *F16L 59/14* | (2006.01) |
| *B32B 5/18* | (2006.01) |
| *B32B 27/06* | (2006.01) |
| *B32B 27/18* | (2006.01) |
| *B32B 27/20* | (2006.01) |

(Continued)

(52) U.S. Cl.
CPC ............... *F16L 59/14* (2013.01); *B32B 5/18* (2013.01); *B32B 27/065* (2013.01); *B32B 27/18* (2013.01); *B32B 27/20* (2013.01); *B32B 27/304* (2013.01); *B32B 27/322* (2013.01); *F16L 5/04* (2013.01); *F16L 55/1026* (2013.01); *F16L 59/026* (2013.01); *F16L 59/029* (2013.01); *F16L 59/145* (2013.01); *B32B 2250/02* (2013.01); *B32B 2250/03* (2013.01); *B32B 2262/065* (2013.01); *B32B 2264/101* (2013.01); *B32B 2264/102* (2013.01); *B32B 2266/0207* (2013.01); *B32B 2266/0214* (2013.01); *B32B 2266/0292* (2013.01); *B32B 2307/102* (2013.01); *B32B 2307/304* (2013.01); *B32B 2307/3065* (2013.01); *B32B 2307/51* (2013.01); *B32B 2307/7246* (2013.01);

(Continued)

(58) Field of Classification Search
None
See application file for complete search history.

(56) References Cited

U.S. PATENT DOCUMENTS 3,165,560 A  *  1/1965  Frey et al. .................... 525/222
3,642,954 A  *  2/1972  Turner ..................... C08L 9/02
                                                        524/521

(Continued)

FOREIGN PATENT DOCUMENTS

| EP | 2116753 A1 | 11/2009 |
| GB | 1454493 | 11/1976 |
| GB | 2041948 A | 9/1980 |

OTHER PUBLICATIONS

European Search Report issued in EP Application No. 10192868.7 dated Mar. 24, 2011, 4 pages.

*Primary Examiner* — Chinessa T. Golden
(74) *Attorney, Agent, or Firm* — Rothwell, Figg, Ernst & Manbeck, P.C.

(57) ABSTRACT

The present invention relates to an organic composite for thermal and/or acoustic insulation comprising an expanded polymer (A) protected against fire by a high strength polymeric flame retardant layer (B), the process for manufacturing of such composite, and the use of such composite.

23 Claims, 2 Drawing Sheets

(51) Int. Cl.
  *B32B 27/30*  (2006.01)
  *B32B 27/32*  (2006.01)
  *F16L 5/04*   (2006.01)
  *F16L 55/10*  (2006.01)
  *F16L 59/02*  (2006.01)

(52) U.S. Cl.
  CPC ...... *Y10T 156/10* (2015.01); *Y10T 428/24752* (2015.01); *Y10T 428/249977* (2015.04)

(56) References Cited

U.S. PATENT DOCUMENTS

| | | | |
|---|---|---|---|
| 3,941,159 A | | 3/1976 | Toll |
| 4,245,055 A | * | 1/1981 | Smith ........................... 521/140 |
| 5,795,634 A | | 8/1998 | Fukui |
| 5,971,034 A | | 10/1999 | Heisey et al. |
| 6,066,580 A | | 5/2000 | Yoshida et al. |
| 6,153,668 A | * | 11/2000 | Gestner et al. ............... 523/179 |
| 6,204,318 B1 | * | 3/2001 | Hayami ................... C08K 3/22 |
| | | | 428/364 |
| 2004/0161562 A1 | | 8/2004 | Graeter et al. |
| 2009/0169860 A1 | * | 7/2009 | Katsunori et al. ......... 428/314.8 |

\* cited by examiner

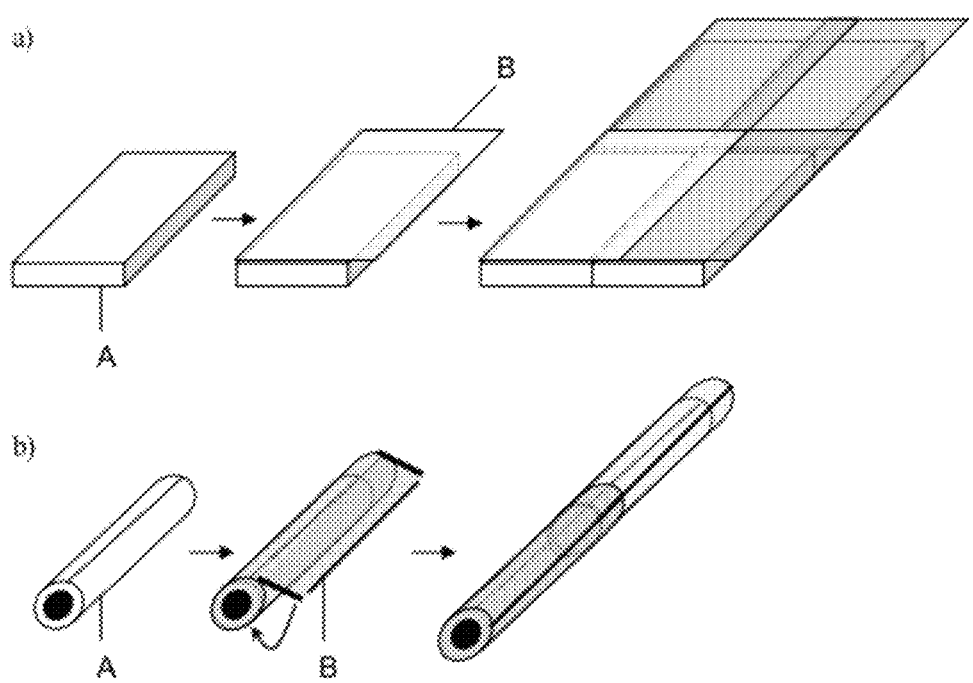

FIRE PROTECTED CELLULAR POLYMERIC INSULATION

CROSS REFERENCE TO RELATED APPLICATIONS

This application claims priority under 35 U.S.C. § 119 to European Patent Application No. 10192868.7 filed Nov. 29, 2010, which is incorporated herein in its entirety.

The present invention relates to an organic composite for thermal and/or acoustic insulation comprising an expanded polymer protected against fire by a high strength polymeric flame retardant layer, the process for manufacturing of such composite, and the use of such composite.

Elastomeric or low density flexible thermoplastic materials have been used since long time for insulation purposes as expanded material (see e.g. brands Armaflex®, Tubolit®, K-Flex® etc.). However, as said materials are of organic nature and due to the fact that cellular material is more sensitive to ignition than massive polymer compound, the respective expanded polymers tend to be very flammable. Numerous attempts have been taken to improve the flame retardancy of organic polymer foams, such as by loading the compound with internal flame retardants (FRs) as it is standard in the rubber and plastics industry and/or by applying flame retardant protective layers (as in U.S. Pat. No. 6,066,580), or mostly metal foil (e.g. in GB 1454493), and also fibres (e.g. EP 2116753). However, all composite solutions with foil, fibre or the like will render the foam stiff, thus, will hamper the manufacturing and use of real flexible insulation foam (FEF). Additionally, foil solutions are rather sensitive to punctual impact. On the other hand, the loading of polymer foams with flame retardants (FRs) has a lot of constraints: flame retardants are not only expensive but may also have a negative impact on processing, expansion and final properties of foamed polymers.

A major object of the present invention thus is to provide a fire protected insulation system that is versatile, reliable, economic and easy to apply both on elastomeric and thermoplastic polymers and which will maintain flexibility of the expanded organic polymer but also will show very good strength and structural integrity of the surface.

Surprisingly, it is found that such a versatile fire safe insulation material not showing the above mentioned disadvantages can be achieved by applying a chlorinated, thus flame retardant, optionally reinforced, flexible layer onto the expanded polymer wherein said layer is based on a matrix of halogenated polymer and optionally being further additivated.

In the drawings, which form a part of this specification,

FIG. 2 is a schematic drawing of possible lap seals for planar or tubular configurations of the claimed material to form tightly sealed insulation installations;

Figure 1:
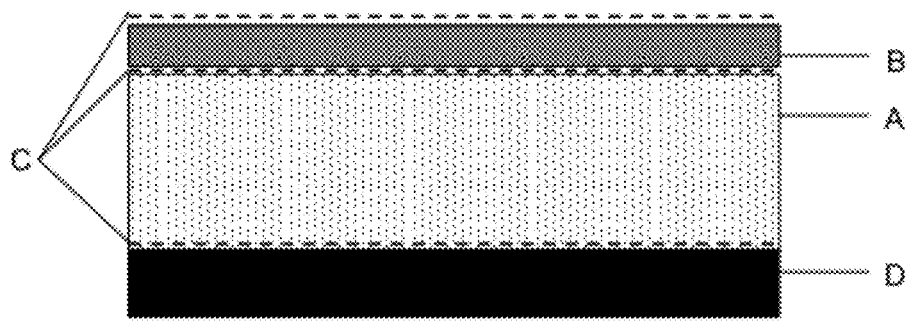
FIG. 1 is a schematic drawing of the claimed thermal and/or sound insulation material composite.

The claimed material comprises at least one layer (A), see FIG. 1, comprising an expanded polymer blend which can be an elastomer or thermoplastic elastomer (e.g. based on polymers of ACM/AEM, AU/EU, BR, BIIR, CIIR, CM/CR, CSM/CSR, (G)(E)CO, EPM/EPDM, EVM, FKM/F(E)PM, GPO, IR, IIR, (V)MQ, (H)NBR, NR, SBR, T, etc.). or thermoplastic (e.g. polyolefins, polyesters such as polyalkylidene terephthalates, polyamides, polyimides, polyaramides, polyethers etc. such as POM, PEEK, polystyrenes, polyurethanes, polyisocyanurates, cellulose acetate and other biopolymers etc.) or thermoset (e.g. phenol formaldehyde, melamin, polyester or epoxy resins etc.) or any combinations thereof.

The expanded polymer blend may comprise a crosslinking system, such as peroxides, hydrosilylation agents, radiation activators (for radiation or UV curing), sulphur compounds, bisphenolics, metal oxides etc.

The expanded polymer blend furthermore comprises at least one expansion agent chosen from the classes of chemical expansion agents (e.g. releasing carbon dioxide, nitrogen, oxygen or water) and/or physical expansion agents (e.g. solvents, CO2, N2, other gases).

The polymer blend is expanded to a mainly closed cell foam with a closed cell content of at least 80% and to a density of less than 80 kg/m3, preferably less than 55 kg/m3, especially preferred less than 45 kg/m3 according to ISO 845 to lower the thermal conductivity to less than 0.075 W/mK at 0° C., preferably less than 0.040 W/mK at 0° C. according to EN 12667.

The polymer blend furthermore may comprise one or more fillers chosen from the classes of metal and half metal oxides or hydroxides, carbon blacks, carbonates, and sulphates.

The polymer blend furthermore may comprise a heat and/or reversion stabilizer system. The stabilizers can be chosen from the classes of carbon blacks, metal oxides (e.g. iron oxide) and hydroxides (e.g. magnesium hydroxide), metal organic complexes, radical scavengers (e.g. tocopherol derivates), complex silicates (e.g. perlite, vermiculite), and combinations thereof.

The polymer blend furthermore may comprise all kinds of other fillers or additives, such as other elastomers, thermoplastic elastomers and/or thermoplastics and/or thermoset based polymer mixtures, or combinations thereof, or as recycled material, other recycled polymer based materials, fibres etc.

The polymer blend may comprise further additives such as flame retardants, biocides, plasticizers, stabilizers (e.g. versus UV, ozone, reversion etc.), colours etc., of any kind in any ratio, including additives for improving its manufacturing, application, aspect and performance properties, such as inhibitors, retarders, accelerators, etc.; and/or additives for adapting it to the applications' needs, such as char-forming and/or intumescent additives, like expanding graphite, to render the material self-intumescent in case of fire to close and protect e.g. wall and bulkhead penetrations; and/or substances that will lead to a self-ceramifying effect to pipes, wall penetrations etc. in case of fire, such as boron compounds, silicon containing compounds etc.; and/or internal adhesion promoters to ensure self-adhesive properties in co-extrusion and co-lamination applications, such as silicate esters, functional silanes, polyols, etc.

Layer (A) may show surface structures on one or both sides for sound and/or thermal decoupling purposes as well as for increasing the surface to adhere to for other layers to be applied. The structure can be of any shape, such as triangular, sinus shape, rectangular, trapezoidal, (semi)circular (semi)multi-edge (e.g. honeycomb) etc., and any combinations thereof. The structure of any shape can be applied in two dimensional manner, as e.g. ridges or tubes, or in three dimensional manner, as e.g. knobs, and any combinations thereof; the structure can be applied longitudinally or transversally or in any combinations thereof. This can be achieved by extrusion, embossing, deep-drawing, moulding, by applying the structure directly or by applying it onto a carrier (layer), in cold, warm or hot state, or in any combination of applicable methods.

The claimed material furthermore comprises at least one outer layer (B), see FIG. 1, comprising at least 20 weight percent of chlorinated organic polymer. The chlorinated polymer is preferably PVC or CPE (chlorinated polyethylene), especially preferred is CPE due to its favourable properties for manufacturing composites. The high halogen content of layer (B) will lead to cooling down the flame in case of fire due to evaporation as well as to stopping of radical reactions taking place in the fire due to recombination.

The organic polymer blend may comprise fillers to increase its mechanical strength, such as metal and half metal oxides or hydroxides, carbon blacks, carbonates, and sulphates, fibres etc. Preferred are fillers releasing vapour in case of fire, such as aluminium trihydrate, and/or non combustible fillers.

The organic polymer blend may comprise at least 5 weight percent, preferably at least 10 weight percent of fibres and/or ground fibres and/or slivers and/or chips for reinforcement purposes, preferably fibres, such as glass fibres, polyester, -aramide, -amide, imide based fibres; or organic fibres, such as from cotton, cellulose, hemp, coconut fibre, sisal, wool, bamboo etc., also as hollow fibres. Preferred are organic fibres as they will lead to the formation of a very stable char together with the halogenated polymer in case of exposition to fire: the halogenated polymer will cool down the flame temperature and lead to incomplete (low oxygen atmosphere) combustion of the organic fibres which subsequently will lead to calcification of the organics of (B) and char formation. The char is found to be extremely stable (vs. temperatures of 1000° C. for >10 minutes) without further ingredients already when said organic fibres are used in a PVC or CPE matrix (see table 2: DIN 4102 observations). Especially stable chars are also observed when inorganic or organic fillers are used, and/or when flame retardants are applied. The fibres may be present as fibre, chopped fibre, ground fibre, nonwoven, tissue, and lattice or in any other applicable shape.

The organic polymer blend therefore may also comprise flame retardant additives, such as brominated FRs, phosphor and phosphorous compounds etc. to further improve its fire resistance.

The organic polymer blend may furthermore comprise all kinds of other fillers or additives, such as other elastomers, thermoplastic elastomers and/or thermoplastics and/or thermoset based polymer mixtures, or combinations thereof, or as recycled material, other recycled polymer based materials, fibres etc.

The organic polymer blend may also comprise further additives such as biocides, plasticizers, stabilizers (e.g. versus UV, ozone, reversion etc.), colours etc., of any kind in any ratio, including additives for improving its manufacturing, application, aspect and performance properties, such as crosslinkers, inhibitors, retarders, accelerators, etc.; and/or additives for adapting it to the applications' needs, such as char-forming and/or intumescent additives; and/or substances that will lead to a self-ceramifying effect; and/or internal adhesion promoters to ensure self-adhesive properties in co-extrusion and co-lamination applications.

Layer (B) can be a massive layer or can be expanded as described for (A). An expanded layer (B) will support the thermal insulation properties, but in some cases lead to worse sound and flame barrier performance.

Layer (B) may be brought into connection with (A) by use of adhesives, preferably flame retardant ones (such as e.g. PVC or CR based adhesives) or by directly melting the two materials together, e.g. by heat or ultra high frequency welding. Surface structures for improving the optical aspect (e.g. for prevention of ripple formation in case of bending the material) and/or improving the flame retardant properties (dilution of fire energy by higher surface) may be applied onto (B) by e.g. embossing them in.

Layer (B) preferably is applied to the substrate (A) in a way to provide one or more overlaps which can be sealed by adhesive and/or application of heat and/or UV to obtain applied composite layers with a complete built-on-top cladding (see FIG. 2 a). For tubular shape materials the overlap consequently can be applied to seal the longitudinal seam of the tube (if it is e.g. cut for better mounting) and/or the transversal seam (or butt joint) between two tubes (see FIG. 2 b).

Layers (A) and (B) can be made as a direct composite, e.g. by co-extrusion or co-moulding, or can be produced separately and then brought together by gluing, UHF welding or melting one or both materials' surface, thus, in a more or less lamination process. This can be done in on- or off-line manner.

The claimed material furthermore may comprise additional layers (C) between (A) and (B), on top and/or bottom of (B), on top and/or bottom of (A), or any combinations thereof (see FIG. 1) that can contribute both to the mechanical strength necessary for the intended application as well as to the fire retardant properties. The compounds for (C) thus may be e.g. fibres, foils, papers, sheet etc. from polymers, metals, ceramics etc. in various forms, but also self-ceramifying, char-forming or intumescent compounds or compounds releasing flame-stopping or cooling or diluting substances, such as gas, vapour, liquids, halides etc., in case of fire. (C) may also have only decorative purpose. (C) may be bond to other layers of the material by adhesives or adhere by itself.

The claimed material furthermore may contain any further element (D) necessary for the intended application, such as wire inlays in case of cables or the like, massive parts such as wood, glass, metal or concrete structures for building purposes etc., or tubular parts, such as corrugated metal pipe for fluid transport etc., see FIG. 1. The elements (D) may be bond to other compounds of the material by adhesives, adhere by themselves or be enclosed mechanically.

A major advantage of the claimed material is its suitability for applications where low flame spread and/or low smoke generation together with maintained integrity of the respective part (e.g. by char formation) are required (e.g. ASTM E-84, EN 13823/EN 13501-1, see table 2).

It is a linked advantage of the claimed material that it is very versatile concerning the fire tests and shows constantly good performance under the different test conditions (see table 2).

A further advantage of the claimed material linked to a.m. advantages is the fact that no additional measures have to be taken to render the substrate fire retardant.

This leads to a further advantage of the claimed material which is the free and economic as well as ecologic choice for foam substrate and its ingredients.

This leads to another advantage of the claimed material as no additional halogenated fire retardants are essentially needed to achieve demanded flame resistance. Especially brominated flame retardants are critical for environmental issues and can generate toxic fumes in case of fire. For that reason brominated flame retardants are already partially prohibited.

It is a linked advantage of the claimed material that it may be flame retardant already without the use of critical chemicals that contain antimony, bromine or boron, as they are still standard in the industry.

It is a prominent advantage of the claimed material that the decoupling of the flame retardancy from the expanded polymer leads to the fact that the polymer base and/or the whole polymer blend can be very economic and only has to provide low thermal conductivity. Therefore, e.g. even natural rubber or polyolefin based blends can be used as insulation foam, which else would never pass respective flammability regulations as a stand-alone product. The material (A) can also be highly filled, e.g. up to almost 80 weight percent with inorganic fillers.

A further advantage of the claimed material is the fact that its flame retardant properties are almost independent from the geometry of the part to be fire protected.

It is a linked advantage of the claimed material that the outer layer provides additional barrier properties and will have positive effect on thermal insulation and vapour diffusion blocking. Typically, the whole composite is showing a water vapour diffusion barrier property of at least μ 2000, preferably at least μ 5000, especially preferred at least μ 8000, according to EN 12086. Vapour barrier properties are essential to prevent corrosion under insulation through condensation of humidity (see table 4).

It is another important advantage of the claimed material that the composite shows a very tough, mechanically strong surface (see table 3) which facilitates mounting and use, however, is still flexible as a whole and can be applied as common for bendable materials, e.g. being pushed over pipe elbows. The toughness of the surface layer is also another advantage for a sustainable vapour blocking property, as it can not be punctured as easily as e.g. foil layers.

A further advantage of the claimed material is its impact resistance against mechanical load, pressure, notch formation, cuts and bites, including attack by rodents, birds or insects or the like, but also improper use, installing or application, which is another advantage for insulation applications.

A further advantage of the claimed material is the possibility to adapt its properties to the desired property profile (concerning mechanics, damping, insulation, flexibility, etc.) by altering the layer thickness and/or density and/or ingredients etc.

It is another important advantage of the claimed material that it provides very easy mounting when being applied with lap seals and that the lap seal leads to air or vapour tight sealing if installations.

It is a prominent advantage of the claimed material that it can be produced in an economic way in a continuous process, e.g. by extrusion and co-lamination or direct co-extrusion. It shows versatility in possibilities of manufacturing and application. It can be extruded, co-extruded, laminated, moulded, co-moulded, overmoulded, welded etc. directly as a multilayer system and thus it can be applied in unrestricted shaping onto various surfaces in automotive, transport, aeronautics, building and construction, furniture, machinery engineering and many other industries, even by a thermoforming or other shaping methods following the manufacturing process of the material.

It is a further advantage of the claimed material that it can be transformed and given shape by standard methods being widespread in the industry and that it does not require specialized equipment.

Another advantage of the material is the fact that the layers (A)-(C) can contain scrapped or recycled material of the same or other kind not loosing its fire retardant properties.

It is a further advantage of the claimed material that the insulation effect can be enhanced by using hollow fibres.

Another advantage of the material is that no phthalate plasticizers are needed, which are suspected of being e.g. liver damaging, kidney damaging and/or carcinogenic. The outer layers (B) and/or (C) can even be completely free of any kind of plasticizers, e.g. phthalates, chlorinated paraffin, organophosphate, etc.

It is a further advantage of the claimed material that no heavy metals containing compounds are needed.

A further advantage of the claimed material is its wide application temperature range only being determined by the expanded polymer. As an example, a claimed material with expanded silicone elastomer (MVQ) as compound for (A) may be used from −100° C. up to +300° C.

A further advantage of the claimed material is its suitability for thermal and sound/vibration insulation applications, ranging from very low to very high temperatures as mentioned above.

It is a linked advantage that different layers for thermal insulation, acoustic insulation, acoustic damping insulation, vibration damping insulation, fire protection insulation, etc. can be combined to achieve best property balance. Single layers do not have to fulfil various demands; therefore no compromises of the properties need to be accepted.

EXAMPLES

In the following examples and comparative examples the required foams and other materials were acquired on the market (e.g. NH=NH/Armaflex®, Armacell GmbH, Germany; HT=HT/Armaflex®, both Armacell GmbH, Germany) or being produced according to state of the art procedures to 25 mm thickness samples. The protective layers were put on the foam parts by prefabricating them as foil on a three roller calendar and then laminating them onto the foam (fibres: STW, Germany, CPE: Elaslen®, Showa Denko, K.K.; PVC: Solvin®, Solvay, Germany).

TABLE 1

Composite materials

| Composite | (B) | FR in (B) | (A) | FR added to (A) |
|---|---|---|---|---|
| 1* | CPE | None | NH | None |
| 2 | CPE, 20% coconut fibre | None | NH | None |
| 3 | CPE, 15% hemp fibre | None | NH | None |
| 4 | CPE, 15% hemp fibre, 30% perlite | 5% brominated FR, 1% $Sb_2O_3$ | NH | None |
| 5 | CPE, 20% coconut fibre | 5% brominated FR, 1% $Sb_2O_3$ | HT | None |
| 6 | CPE, 20% coconut fibre | 5% brominated FR, 1% $Sb_2O_3$ | HT | 5% brominated FR, 1% $Sb_2O_3$ |
| 7* | PVC | None | NH | None |
| 8 | PVC, 20% coconut fibre | None | NH | None |
| 9 | PVC, 15% hemp fibre | None | NH | None |
| 10 | PVC, 15% hemp fibre, 30% perlite | 5% brominated FR, 1% $Sb_2O_3$ | NH | None |
| 11 | PVC, 20% coconut fibre | 5% brominated FR, 1% $Sb_2O_3$ | HT | 5% brominated FR, 1% $Sb_2O_3$ |

(*= comparative example)

The manufactured composites were partially examined for fire retardant behaviour according to EN 13823/EN 13501-1 (single burning item/round corner test), DIN 4102, ASTM E-84 and UL 94 (horizontal/vertical burn). Table 2 shows the results as well as the observations about the layers' behaviour during and after the DIN test.

TABLE 2

Flammability test results

| Com-posite | EN 13823/ 13501-1 | DIN 4102 | Observation on DIN 4102 | UL 94 -coating on one side/ two sides | ASTM E-84 |
|---|---|---|---|---|---|
| 1* | D s3 d0 | B2 | — | HB/HB | 150/400 |
| 2 | C s3 d0 | B1 | Char form. visible | V-2/V-1 | 75/250 |
| 3 | C s3 d0 | B1 | Char form. visible | V-2/V-2 | 75/300 |
| 4 | B s3 d0 | B1 | Very strong and stable char | V-1/V-1 | n.e. |
| 5 | C s3 d0 | B1 | Char form. visible | V-2/V-1 | n.e. |
| 6 | B s3 d0 | B1 | Strong char | V-1/V-0 | 50/250 |
| 7* | D s3 d0 | B2 | — | HB/V-2 | n.e. |
| 8 | C s3 d0 | B1 | Char form. visible | HB/V-2 | n.e. |
| 9 | C s3 d0 | B1 | Char form. visible | V-2/V-2 | n.e. |
| 10 | C s3 d0 | B1 | Very strong and stable char | V-2/V-1 | n.e. |
| 11 | B s3 d0 | B1 | Strong char | V-2/V-2 | n.e. |

(n.e.: not examined,
*= comparative example)

Table 3 shows the mechanical resistance of selected composite top layers versus rupture and mechanical impact.

TABLE 3

Mechanical properties

| Composite | Tension at 50% elongation [N/mm$^2$] | Tensile strength [N/mm$^2$] | Puncture resistance testEN 14477 |
|---|---|---|---|
| 1* | 1.0 | 13.5 | fail |
| 2 | 3.2 | 11.0 | passed |
| 2 + 10% ground glass fibre | 7.2 | 12.7 | passed |
| 3 | 2.6 | 12.3 | fail |
| 3 + 10% ground glass fibre | 6.8 | 12.5 | passed |
| 4 | 3.4 | 10.4 | passed |
| 4 + 10% ground glass fibre | 5.9 | 11.2 | passed |

(*= comparative example)

Table 4 shows the insulation properties of the claimed material vs. the comparative examples according to EN 12667 and EN 12086.

TABLE 4

Insulation properties

| Composite | λ [W/m * K] at 0° C. according to EN 12667 | μ according to EN 12086 |
|---|---|---|
| 1* | 0.038 | 11500 |
| 2 | 0.036 | 9500 |
| 3 | 0.036 | 8400 |
| 4 | 0.035 | 6500 |

(*= comparative example)

We claim:

1. A material comprising:
   at least one inner layer (A) of expanded polymer blend; and
   at least one outer, foil layer (B) comprising:
   (i) at least 20 weight percent of chlorinated polyethylene (CPE),
   (ii) at least 5 weight percent of a fibrous material, and
   (iii) at least 5 weight percent of a brominated fire retardant,
   wherein the polymer blend is expanded to a foam with a closed cell content of at least 80% and a density of less than 80 kg/m$^3$ according to ISO 845, and wherein the material has a tensile strength between about 10.4 N/mm$^2$ and 12.7 N/mm$^2$; and
   wherein a bottom surface of layer (B) is applied to an upper surface of layer (A) such that layer (B) is laminated onto layer (A).

2. The material according to claim 1 having a thermal conductivity of less than 0.075 W/mK at 0° C. according to EN 12667.

3. The material of claim 2, wherein the thermal conductivity is less than 0.040 W/mK at 0° C. according to EN 12667.

4. The material according to claim 1 having a water vapour diffusion barrier property of at least μ 2000 according to EN 12086.

5. The material according to claim 1 where the fibrous material comprises organic fibres.

6. The material according to claim 1 wherein the outer layer (B) is loaded with flame retardants, intumescent substances, char-forming substances, or any combination thereof, and/or is self-ceramifying in case of fire.

7. The material according to claim 1 wherein the outer layer (B) contains less than 80 weight percent of inorganic material.

8. The material according to claim 1 wherein layer (B) is expanded to a foam or sponge.

9. The material according to claim 1 wherein layer (B) has one or more overlaps which can be sealed by adhesive, application of heat, UV or any combination thereof to obtain a tight sealing of seams between parts made out of the claimed material, wherein for materials of tubular shape the overlap is applied to seal the longitudinal seam of an optionally cut tube and/or the transversal seam (butt joint) between two tubes.

10. The material according to claim 1 wherein additional layers (C) are applied on the outer layer.

11. The material according to claim 10 wherein the additional layer (C) is a fibrous layer, applied beneath and/or on to of layer (B).

12. The material according to claim 1 wherein the layers are bonded with an adhesive which is flame retardant and wherein the layers adhere by themselves, are bonded by melting, are bonded by UHF welding, or combinations thereof.

13. The material according to claim 1 where surface structures are applied on the inner and/or the outer side of any layer.

14. The material of claim 1, wherein the density is less than 55 kg/m3 according to ISO 845.

15. The material of claim 14, wherein the density is less than 45 kg/m3 according to ISO 845.

16. The material of claim 1, wherein the material has a water vapour diffusion barrier of at least μ 5000 according to EN 12086.

17. The material of claim 16, wherein the material has a water vapour diffusion barrier of at least μ 8000 according to EN 12086.

18. The material of claim 1, wherein (B) contains at least 10 weight percent fibrous material.

19. The material of claim 1, wherein layer (B) contains 1 weight percent Sb2O3.

20. The material of claim 1, wherein the fibrous material is coconut fibre or hemp fibre.

21. A process for manufacturing the material according to claim 1 in a continuous process.

22. A process for manufacturing the material according to claim 1 wherein layers (A) and (B) are manufactured in a co-extrusion or co-lamination process.

23. A process for manufacturing the material according to claim 10 wherein the layers (B) and (C) are applied onto layer (A) as a pre-fabricated composite.

\* \* \* \* \*